United States Patent Office

3,179,644
Patented Apr. 20, 1965

3,179,644
β-NITRATOETHYL ACRYLATE AND EXPLOSIVE COMPOSITIONS MADE THEREWITH
Joseph W. Lawrence and Harold F. Bluhm, Tamaqua, Pa., assignors to Atlas Chemical Industries, Inc., Wilmington, Del., a corporation of Delaware
No Drawing. Filed Sept. 17, 1962, Ser. No. 224,212
2 Claims. (Cl. 260—89.5)

The present invention relates to explosive or readily combustible plastic materials. More particularly the present invention relates to β-nitratoethyl acrylate, polymers thereof, and explosive mixtures containing polymerized β-nitratoethyl acrylate.

The plastic compositions of the present invention may be readily prepared by heating β-nitrato ethanol and acrylyl chloride in the presence of a polymerization inhibitor such as hydroquinone and quaternary ammonium salts to form β-nitrato ethyl acrylate monomer. The monomer may then be heated in the presence of a small amount of a polymerization catalyst, e.g., methyl ethyl ketone, inorganic per salts of peroxides, such as hydrogen peroxide, inorganic perborates and persulfates, organic per acids and peroxides, such as benzoyl peroxide, to form β-nitrato ethyl acrylate polymer.

Ammonium nitrate is widely used as a component of explosives, however, it is highly soluble in water and it is extremely insensitive to ordinary heating and shock, and cannot be readily detonated by means of a #6 blasting cap normally used to detonate commercial explosives. The β-nitratoethyl acrylate polymer of the present invention is aptly suited to use as a sensitizer for ammonium nitrate. Preferably the ammonium nitrate is in particulate form and is coated or encased by the polymer. Ammonium nitrate sensitized with a coating of β-nitratoethyl acrylate polymer exhibits excellent water resistance. The coated product may be used with benefit as the ammonium nitrate ingredient of commercial explosives.

The following examples illustrate a means of preparing the compositions of the present invention. In each of the examples, the parts given are by weight.

EXAMPLE I

*Preparation of the monomer*

14.38 grams of β-nitratoethanol were mixed with 24.3 grams of acrylyl chloride in a 100 ml. flask equipped with a reflux condenser and a thermometer. Agitation was provided by a magnetic stirring bar. The mixture was slowly heated by means of an oil bath from room temperature to 45° C. under a pressure of about 1 mm. of Hg over a period of 2 hours. HCl gas evolved rapidly at first and over a period of 1 hour. The monomer product was 24.6 grams of a clear yellow fluid having a very slight odor of acrylic chloride. The monomer product was then purified by dissolving the product in methylene chloride passing it through a column of alumina. The methylene chloride solvent was then evaporated to yield a clear yellow fluid. 4 gms. of this fluid was further purified by distillation under reduced pressure. 0.05 gram of hydroquinone was added to prevent polymerization. The distillation was continued for 1 hour at a distillate temperature of about 50° C. and a pressure of about 0.2 mm. of Hg. The distillation was stopped after the collection of 2 g. of clear white liquid monomer product. The theoretical percentage of nitrogen for the monomer was 8.70% by weight. The actual percentage of nitrogen found by the Dumas method was 8.24% by weight.

EXAMPLE II

*Preparation of the polymer*

The monomer product from Example I was polymerized by heating it to a temperature of between 90 and 100° C. in the presence of a trace of benzoyl peroxide. An increase in viscosity was noted after the monomer product had been heated for 5 minutes. After one hour additional polymerization as noted by apparent hardness had ceased. The resulting polymer was a non-sticky rubber-like material. The percent of nitrogen in the polymer was determined by the Dumas method and found to be 8.17% by weight.

The polymer burns vigorously on heating leaving substantially no residue. It is suitable as a propellant component.

On heating a sample of the β-nitratoethyl acrylate to a temperature of 150° C., no decomposition was noted, indicating a heat stability comparable to or exceeding that of nitrostarch and nitrocellulose.

A portion of the β-nitratoethyl acrylate polymer was dissolved in chloroform by standing in the chloroform for a period of 24 hours. Particulate ammonium nitrate in an amount equal in weight to the amount of polymer was added to and mixed with the polymer-chloroform mixture. The chloroform solvent was then evaporated off giving a coated ammonium nitrate product. A comparison of the water solubility of the coated product and untreated ammonium nitrate was made by placing equal weight samples of the coated product and uncoated ammonium nitrate in water. The uncoated ammonium nitrate was entirely dissolved in the water in 5 minutes while the polymer coated ammonium nitrate required 30 minutes for the ammonium nitrate to go into solution. The coated material is a useful explosive ingredient.

EXAMPLE III

A thick paste was prepared by blending 4 parts by weight of particulate pentaerythritol tetranitrate with 1 part by weight of β-nitrataoethyl acrylate monomer at room temperature. 0.01 part by weight of a methyl ethyl ketone catalyst was then added to the mixture and the mixture agitated until the catalyst was evenly distributed. The composition was then cast in a cardboard cylinder. After 24 hours, with no external heat applied, the casting had cured to a dense tack-free resilient solid. The explosive product was found to be sensitive to a No. 6 blasting cap.

What is claimed is:
1. β-Nitratoethyl acrylate.
2. β-Nitratoethyl acrylate homopolymer.

References Cited by the Examiner

UNITED STATES PATENTS

| | | | |
|---|---|---|---|
| 2,430,239 | 11/47 | Muller | 149—93 |
| 2,449,804 | 9/48 | D'Alelio et al. | 260—89.5 |
| 2,853,511 | 9/58 | Boedecker et al. | 260—467 |
| 2,860,156 | 11/58 | Cannon | 260—467 |
| 2,992,087 | 7/61 | Fassnacht et al. | 149—93 |
| 3,068,129 | 12/62 | Schaffel | 149—60 |

OTHER REFERENCES

Marans et al.: JACS, vol. 72 (1950), pages 2125–6.

JOSEPH L. SCHOFER, *Primary Examiner.*

L. D. ROSDOL, J. R. LIBERMAN, LEON J. BERCOVITZ, *Examiners.*